J. H. LITTLEFIELD.
Whiffletree.
No. 48,416.
Patented June 27, 1865.
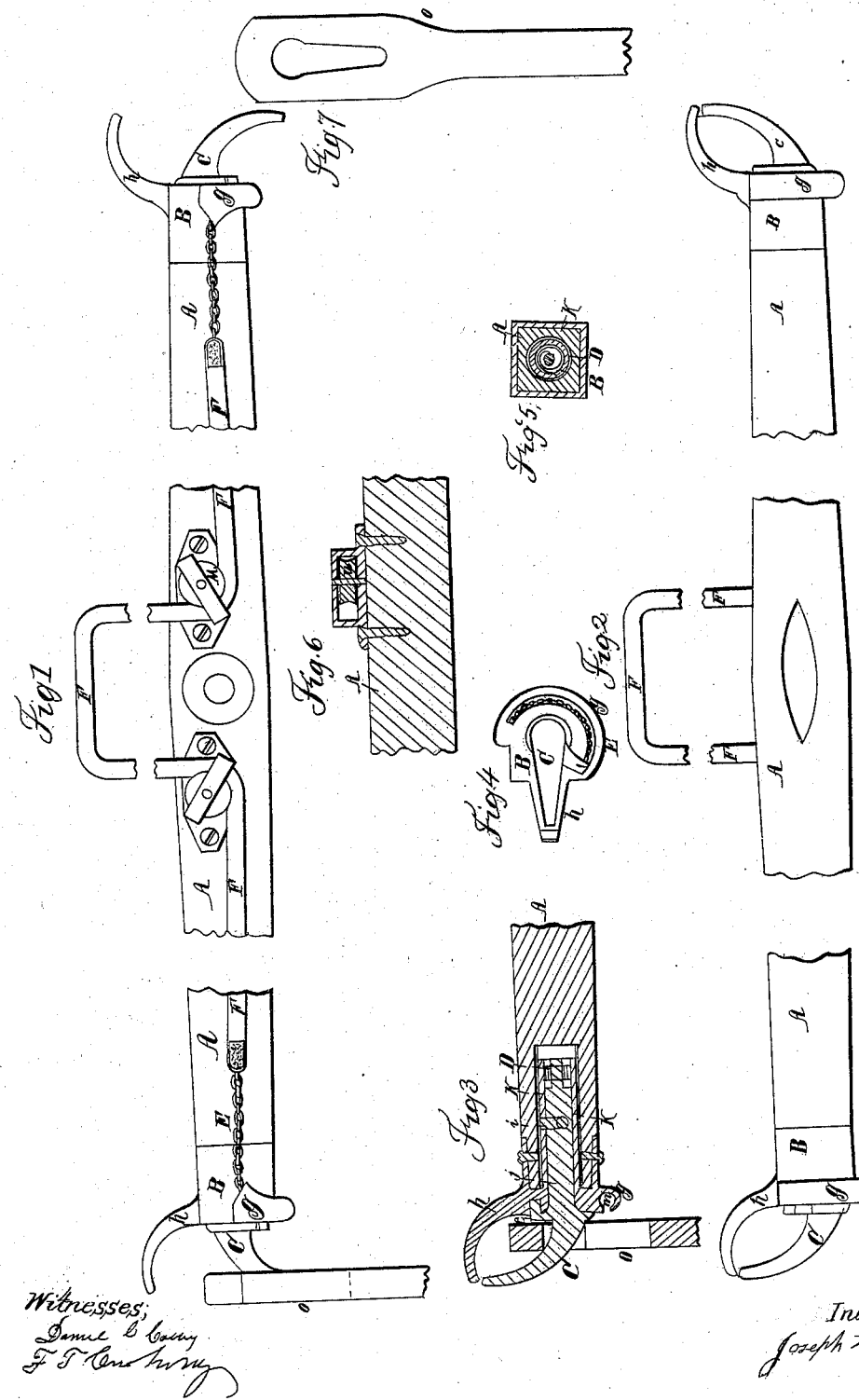

UNITED STATES PATENT OFFICE.

JOSEPH H. LITTLEFIELD, OF CAMBRIDGE, MASSACHUSETTS.

IMPROVEMENT IN WHIFFLETREES.

Specification forming part of Letters Patent No. 48,416, dated June 27, 1865.

*To all whom it may concern:*

Be it known that I, JOSEPH H. LITTLEFIELD, of Cambridge, in the county of Middlesex and State of Massachusetts, have invented new and useful improvements in attachments to whiffletrees for carriages to facilitate the relieving of the horse from the carriage in case of accident or other necessity arising suddenly; and I do hereby declare that the following is a full and exact description of the same, reference being had to the drawings that accompany and form a part of these specifications, in which—

Figure 1 is a view of the under side of the whiffletree with the various attachments thereto; Fig. 2, a top view of the whiffletree as it appears on the carriage; Fig. 3, a sectional view divided longitudinally through the center; Fig. 4, sectional view divided crosswise in a line with the harness-tug; Fig. 5, a sectional view divided across the shaft of the whiffletree; Fig. 6, one of the pulleys on the under side of the whiffletree. Fig. 7 represents a piece of the harness tug or trace.

The same letters represent corresponding parts in the different figures.

Letter A represents the shaft of the whiffletree; B, the body of the ferrule clasping the end of the whiffletree; C, the hook to which the tug is attached; D, a spring to keep the hook C in place when in use; E, a chain connecting the rotating hook C with the cord F; F, a cord reaching to the carriage or within reach of the driver; g, a flange sufficient to contain a slot for the chain E; h, an extension from the ferrule B, and forming a guard against the tugs coming off when in ordinary use; i, a pin inserted in the spindle j and in a slot in the socket k, and acting to keep the spindle j from coming out; j, a spindle, joining by its collar to the hook C; k, a socket for the spindle j, and is of the same piece with the ferrule A; l, a short lever on the hook C, to which the chain E is attached; m, a curved slot in the flange g, in which the end of the lever l and the chain E move back and forth; n n, pulleys on the under side of the whiffletree for the cord F to pass over, as may be seen in Fig. 1; o o, tugs or traces to the harness; p, a pin formed on the end of the spindle j, on which the spring D coils.

To enable others skilled in the art to make and use my invention, I will describe its construction and mode of operation.

The ferrule A, the flange g, the guard h, and the socket k are of malleable iron, and all in one piece, as may be seen by examining the drawings.

The hook C, with its spindle j and pin p, around which the spring D coils, are all in one piece and of malleable iron or its equivalent.

The chain E is made of short links, so that it may run easily in the slot m, or a hard smooth cord may be used instead of the chain.

The coil-spring D, of wire, is seen in Fig. 2, also in Fig. 5, one end of which is fastened to the socket k and the other to the spindle j.

The cord F should be hard round cord, and running as seen in Fig. 1, or a strap of leather may be substituted therefor.

As to the mode of operation, I will suppose all the parts complete and arranged as in Fig. 1, and the whiffletree in position, as seen in Fig. 2. The cord or strap F is taken hold of by the hand and drawn, when the chain slips in slot m, carries around the end of the lever l, and overcomes the force of the spring D, thus turning the spindle j in its socket k, causing the hook C to turn half over and assume the position seen in Fig. 1, when the tug immediately slips off.

In putting on the tug the hook C is raised by the hand slightly, just to let it slip on.

This invention, used in connection with my recently-invented self-releasing breeching-hook, will be of great value to the public, often saving a valuable life and sometimes lives.

Now, I do not claim the principle of self-releasing whiffletrees, broadly; but

What I do claim, and desire to secure by Letters Patent, is—

The combination of the ferrule B, having its guard h and socket k, the hook C, having its lever l, spindle j, and pin p, the spring D, and the cord and chain F and E, or their equivalent, all arranged substantially as described and for the purposes set forth.

JOSEPH H. LITTLEFIELD.

Witnesses:
DANIEL C. COLBY,
JABEZ A. SAWYER,